(12) United States Patent
Lee

(10) Patent No.: US 8,274,526 B2
(45) Date of Patent: Sep. 25, 2012

(54) METHOD, APPARATUS AND SYSTEM FOR VISUAL GAMMA CORRECTION OF DISPLAYS

(75) Inventor: Bongsun Lee, La Crescenta, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 537 days.

(21) Appl. No.: 12/448,154

(22) PCT Filed: Dec. 14, 2006

(86) PCT No.: PCT/US2006/047762
§ 371 (c)(1),
(2), (4) Date: Jun. 10, 2009

(87) PCT Pub. No.: WO2008/073097
PCT Pub. Date: Jun. 19, 2008

(65) Prior Publication Data
US 2010/0061694 A1 Mar. 11, 2010

(51) Int. Cl.
| | |
|---|---|
| G09G 5/00 | (2006.01) |
| G09G 5/02 | (2006.01) |
| G09G 5/10 | (2006.01) |
| G09G 5/36 | (2006.01) |
| H04N 5/202 | (2006.01) |
| H04N 5/57 | (2006.01) |
| H04N 5/14 | (2006.01) |
| H04N 1/46 | (2006.01) |
| G06F 15/00 | (2006.01) |
| G06K 15/00 | (2006.01) |
| G06K 9/00 | (2006.01) |
| G03F 3/08 | (2006.01) |
| G06K 9/36 | (2006.01) |

(52) U.S. Cl. ........ 345/590; 345/428; 345/581; 345/617; 345/690; 345/548; 348/254; 348/603; 348/615; 348/673; 358/3.06; 358/1.9; 358/518; 358/520; 358/534; 382/165; 382/167; 382/254; 382/274; 382/276

(58) Field of Classification Search .................. 348/571, 348/674, 607, 687, 254–256, 602–603, 615, 348/630, 671–673; 345/418, 426, 597, 601, 345/617–619, 545–549, 555, 204, 207, 690, 345/694, 428, 581, 589–591, 600–602, 596; 358/3.06, 3.3, 518–520, 523, 534, 1.1, 1.9; 382/162, 165, 167, 181
See application file for complete search history.

(56) References Cited

U.S. PATENT DOCUMENTS
5,526,058 A * 6/1996 Sano et al. .................... 348/647
(Continued)

FOREIGN PATENT DOCUMENTS
EP 1427187 6/2004
(Continued)

OTHER PUBLICATIONS
International Search Report, dated Jul. 13, 2007.

*Primary Examiner* — Wesner Sajous
(74) *Attorney, Agent, or Firm* — Robert D. Shedd; Robert B. Levy

(57) ABSTRACT

A method, apparatus and system for visual gamma correction of a display system includes retrieving input gamma information from input content, determining at least one pattern representing luminance of the received content based upon at least the retrieved gamma information, displaying the at least one determined pattern representing the luminance of the received image content and at least one corresponding reference image on the display system, and adjusting the brightness and contrast of the least one reference image on the display system to approach the luminance of a corresponding determined pattern to determine a corrected gamma for the display system.

25 Claims, 8 Drawing Sheets

U.S. PATENT DOCUMENTS

| | | | |
|---|---|---|---|
| 561,349 A | 4/1997 | Ueda et al. | |
| 5,864,370 A | 1/1999 | Knox et al. | |
| 2001/0046060 A1* | 11/2001 | Kamiya | 358/1.13 |
| 2002/0080147 A1 | 6/2002 | Edge et al. | |
| 2002/0149598 A1* | 10/2002 | Greier et al. | 345/589 |
| 2002/0158882 A1 | 10/2002 | Liaw et al. | |
| 2003/0001956 A1* | 1/2003 | Harshbarger et al. | 348/189 |
| 2003/0053001 A1* | 3/2003 | Murashita et al. | 348/649 |
| 2004/0239698 A1* | 12/2004 | Kamada et al. | 345/714 |
| 2005/0099429 A1 | 5/2005 | Chen et al. | |
| 2005/0169551 A1* | 8/2005 | Messing et al. | 382/260 |
| 2005/0185972 A1* | 8/2005 | Yamamura | 399/24 |
| 2006/0132867 A1* | 6/2006 | Sugiyama et al. | 358/504 |
| 2006/0164442 A1 | 7/2006 | Furuhata et al. | |
| 2006/0202929 A1 | 9/2006 | Baum et al. | |
| 2006/0250412 A1 | 11/2006 | Chen et al. | |
| 2007/0115232 A1* | 5/2007 | Urisu | 345/88 |
| 2008/0181494 A1* | 7/2008 | Watanabe et al. | 382/167 |

FOREIGN PATENT DOCUMENTS

| | | |
|---|---|---|
| EP | 1441518 | 7/2004 |

* cited by examiner

METHOD, APPARATUS AND SYSTEM FOR VISUAL GAMMA CORRECTION OF DISPLAYS

This application claims the benefit, under 35 U.S.C. §365 of

International Application PCT/US2006/047762, filed Dec. 14, 2006, which was published in accordance with PCT Article 21(2) on Jun. 19, 2008 in English.

TECHNICAL FIELD

The present invention generally relates to display calibration and characterization, and more particularly, to visual gamma correction of a display such that the display can more accurately display gamma corrected video sequences or images.

BACKGROUND OF THE INVENTION

Gamma correction provides for an accurately depicted display image on a display device. More specifically, Gamma correction controls the overall brightness of an image. Images which are not properly corrected may appear bleached out, or too dark. Gamma correction affects not only the brightness, however, but also the ratios of red to green to blue. Gamma correction is applied to a voltage response curve used to render images in various instances to compensate for differences in intensity. That is, a range of voltages sent to a display can generally be less than the desired or required voltages for correct display of an image. As such, the voltages require correction to more accurately depict the image. Since the relationship between the voltage sent to the display and the intensity which the display produces are known, a signal can be corrected by gamma correction before it gets to the display.

In conventional systems, input source images have associated with them assumed gamma characteristics for a display (e.g., Rec. 709 gamma, which is a transfer function known in the art). However, most displays depict different gamma characteristics from those assumed, such that input images are not correctly depicted on the display. A conventional method of characterizing a display includes measuring patches on the display using, for example, a spectroradiometer. In particular, for gamma characteristics, a series of patches are measured (this is called a ramp—e.g., a gray ramp is (Red, Green, Blue)=(0,0,0), (32,32,32), (64, 64, 64), . . . , (224, 224, 224), (255, 255, 255)). After the measurement, a gamma curve can be plotted (e.g., luminance vs. digital value). FIG. 1 depicts an illustrative plot of luminance versus input digital value for use in gamma correction of an image.

The gamma curve 10 of FIG. 1 is typically implemented to compensate for incorrect input gamma values.

Digital video capture images or still capture images are gamma corrected by assuming certain gamma characteristics for display systems. For example, for high definition (HD) displays, Rec. 709 gamma is applied for gamma correction of an input device or input images. For displaying images that look-like film images on a display, a proprietary gamma (either a gamma power function curve or lookup table (LUT)) is applied for the gamma correction. However, the gamma characteristic of the displays usually does not match the assumed gamma correction applied for the input space. As such, in a typical characterization method, the input gamma is linearized (inverse gamma correction) and the gamma is corrected again using the display gamma.

FIG. 2 depicts an exemplary flow diagram of a conventional method for gamma correction along with corresponding plots of luminance versus input digital value for each of the steps of the flow diagram. The method of FIG. 2 begins in block 20, in which input gamma is determined from a received image. In block 22, the input is linearized by providing a LUT or function that linearizes the input gamma. Subsequently, in block 24, the gamma changes attributable to displaying the received image on the display are determined and corrected for, in block 26, to provide a display gamma curve or function as depicted in FIG. 1. Plots 30, 32, 34 and 36 of FIG. 2 illustratively depict the processing performed by the corresponding process in blocks 20, 22, 24, and 26, respectively. Plots 30, 32, 34 and 36 illustrate a normalized luminance (y-axis) versus an input digital value (x-axis). Consistent with FIG. 2, a characterization of a display is performed to determine a more accurate representation of input images on the display.

While this methodology is accurate and reliable, it has some significant drawbacks. For example, this method: 1) requires costly instrumentation to perform measurements; 2) requires time consuming methods to measure a plurality of patches; and 3) needs to derive the gamma curve from measurement data, among other things.

SUMMARY OF THE INVENTION

A method, apparatus and system in accordance with various embodiments of the present invention addresses the deficiencies of the prior art by providing visual characterization of an output gamma using brightness and/or contrast level controls of a display so that the display gamma matches an input source gamma.

In one embodiment of the present invention, a method for visual gamma correction of a display system includes retrieving input gamma information from input content, determining at least one pattern representing luminance of the received content based upon at least the retrieved gamma information, displaying the at least one determined pattern representing the luminance of the received image content and at least one corresponding reference image on the display system, and adjusting the brightness and contrast of the at least one reference image on the display system to approach the luminance of a corresponding determined pattern to determine a corrected gamma for the display system. In various embodiments of the present invention, the at least one pattern includes a halftone matrix having black and white dots where a ratio of black and white dots is determined based on luminance of the received content. In addition, the at least one reference image can include a corresponding continuous-tone image for each of the determined at least one patterns.

In an alternate embodiment of the present invention, an apparatus for visual gamma correction of a display system includes a memory for storing at least gamma information and control programs and a processor for executing the control programs. The apparatus is configured to retrieve gamma information relating to received image content, determine at least one pattern representing the luminance of the received image content based upon at least the received gamma information, enable the display of the at least one determined pattern representing the luminance of the received image content and at least one corresponding reference image on the display system, enable the adjustment of brightness and contrast of the at least one reference image on the display system to approach the luminance of a corresponding determined pattern. In one embodiment of the invention, the apparatus generates a graphical user interface for enabling the display of the at least one determined pattern and the at least one corresponding reference image on the display system for enabling the adjustment of the brightness and contrast of the at least one reference image on the display system to approach the luminance of a corresponding determined pattern.

In an alternate embodiment of the present invention, a system for visual gamma correction of a display system includes a content source for providing image content and gamma information relating to the image content, a video playback device for receiving the image content and the gamma information from the content source and for communicating display images to the display system, and a display system for displaying the images communicated from the playback device. The system further includes a gamma correction device including a memory for storing at least the gamma information and control programs and a processor for executing the control programs. The gamma correction device of the system of the embodiment of the present invention is configured to retrieve the gamma information relating to the received image content, determine at least one pattern representing luminance of the received image content based upon at least the retrieved gamma information, enable the display of the at least one determined pattern representing the luminance of the received image content and at least one corresponding reference image on the display system, and enable the adjustment of brightness and contrast of the at least one reference image on the display system to approach the luminance of a corresponding determined pattern.

BRIEF DESCRIPTION OF THE DRAWINGS

The teachings of the present invention can be readily understood by considering the following detailed description in conjunction with the accompanying drawings, in which.

Figure 1:
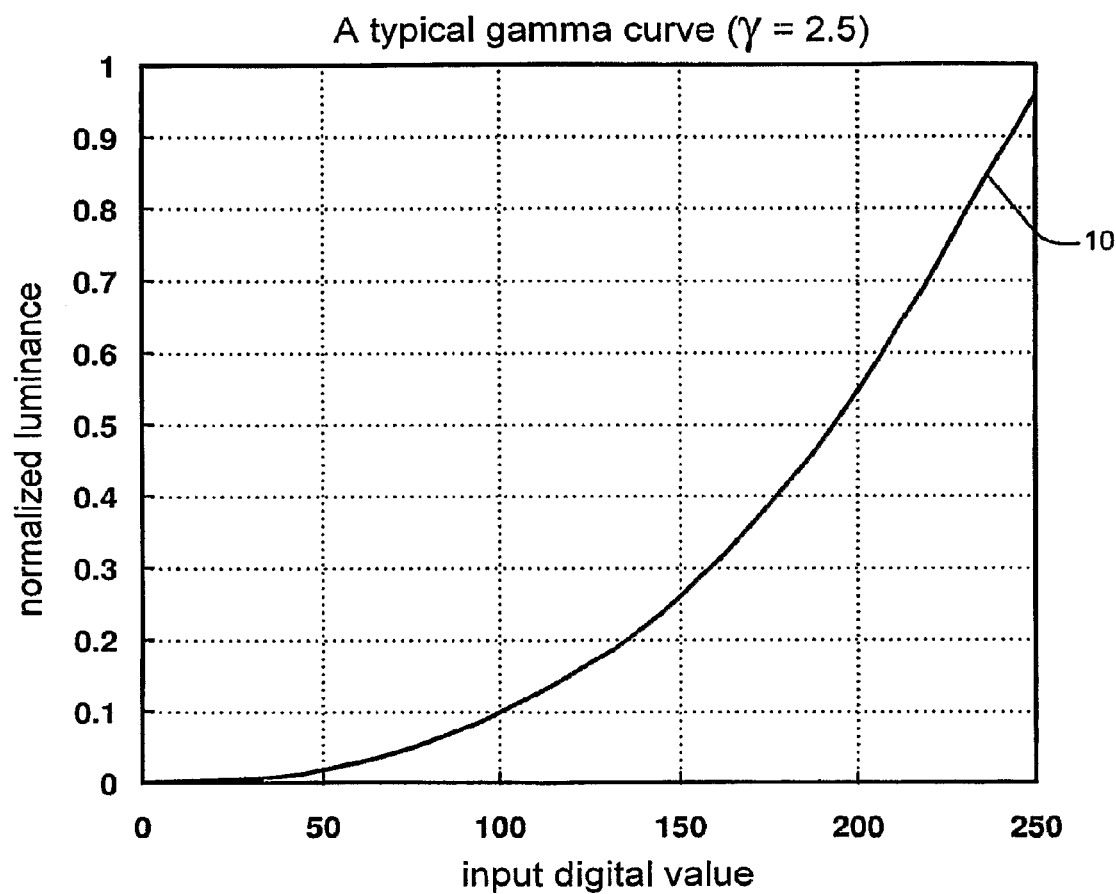
FIG. 1 depicts an illustrative plot of luminance versus input digital value for use in gamma correction of an image.
Figure 2A:
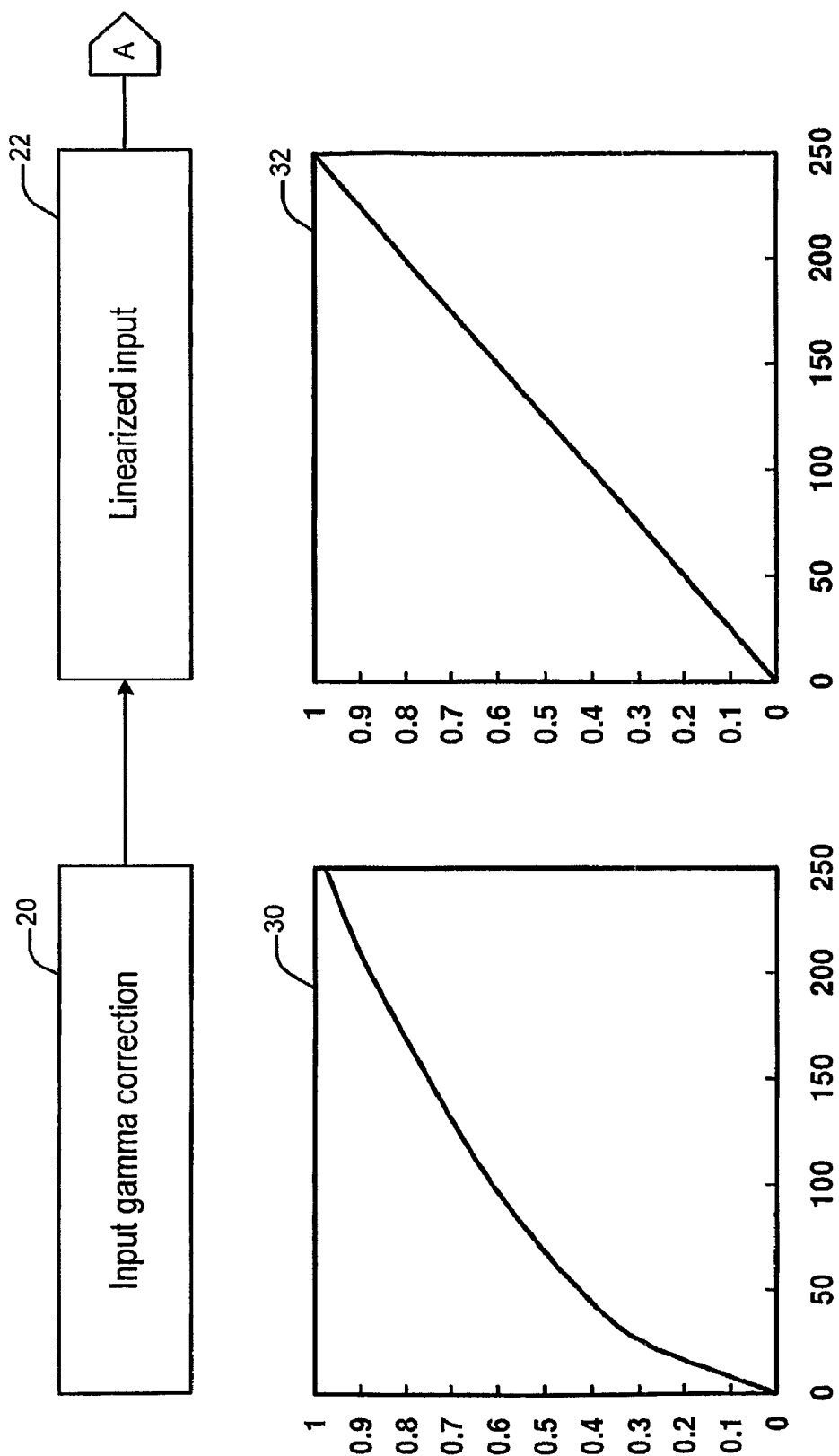
FIG. 2 depicts an exemplary flow diagram of a conventional method for gamma correction and corresponding plots of luminance versus input digital value for each of the step of the flow diagram.
Figure 2B:
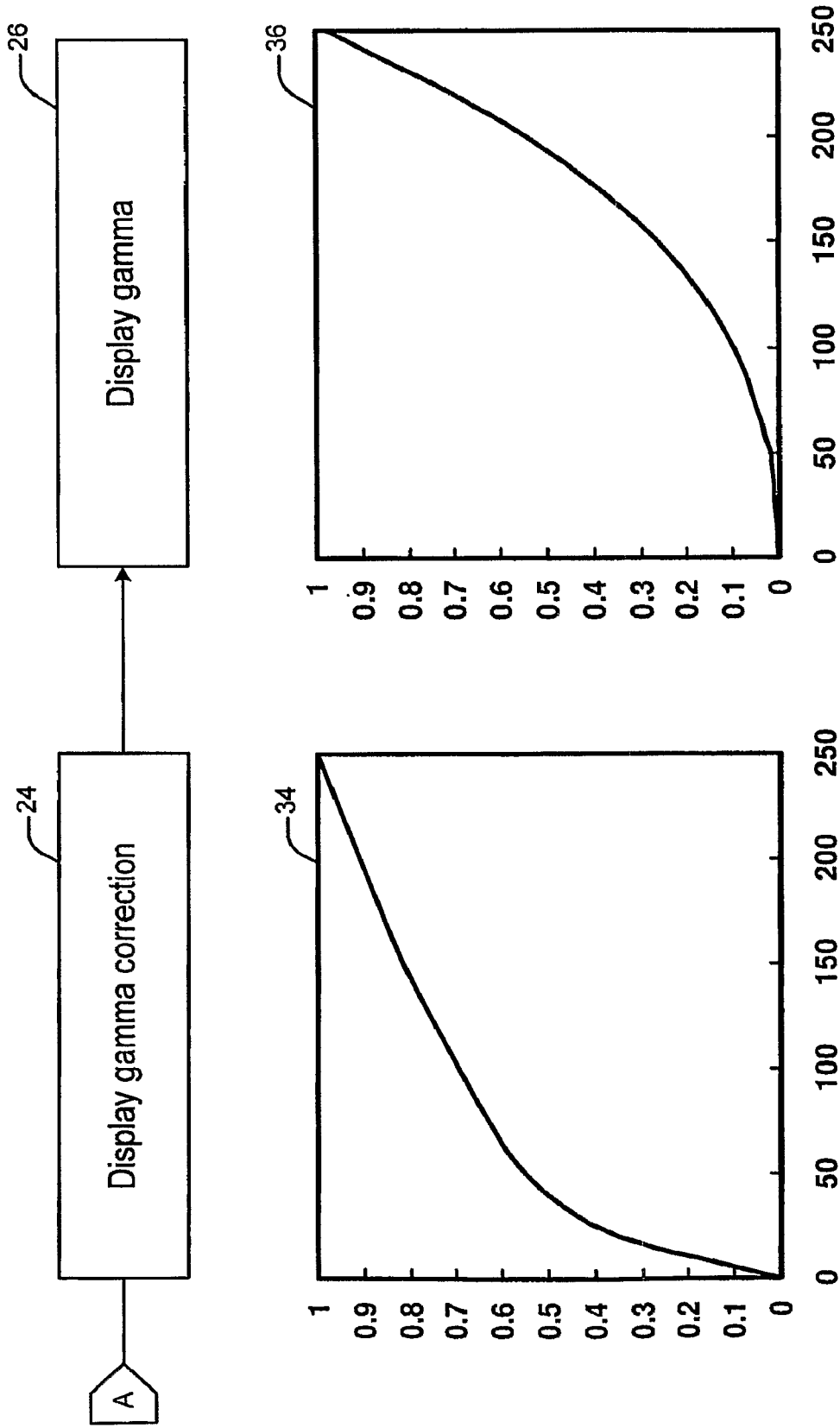

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method, apparatus and system for visual gamma correction. Although the present invention will be described primarily within the context of a playback system and a playback device using a single gamma curve, the specific embodiments of the present invention should not be treated as limiting the scope of the invention. It will be appreciated by those skilled in the art and informed by the teachings of the present invention that the concepts of the present invention can be advantageously applied in film color correction, digital photography or any other application in which an image is rendered and applying one or more gamma curves.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In accordance with various embodiments of the present invention, a plurality of gamma curves can be implemented for gamma correction (e.g., one or more gamma curve for each of three channels; red, green, blue). However, for simplicity, various concepts of the present invention will be explained with reference to a single channel or color component signal and a respective gamma curve.

Figure 3:
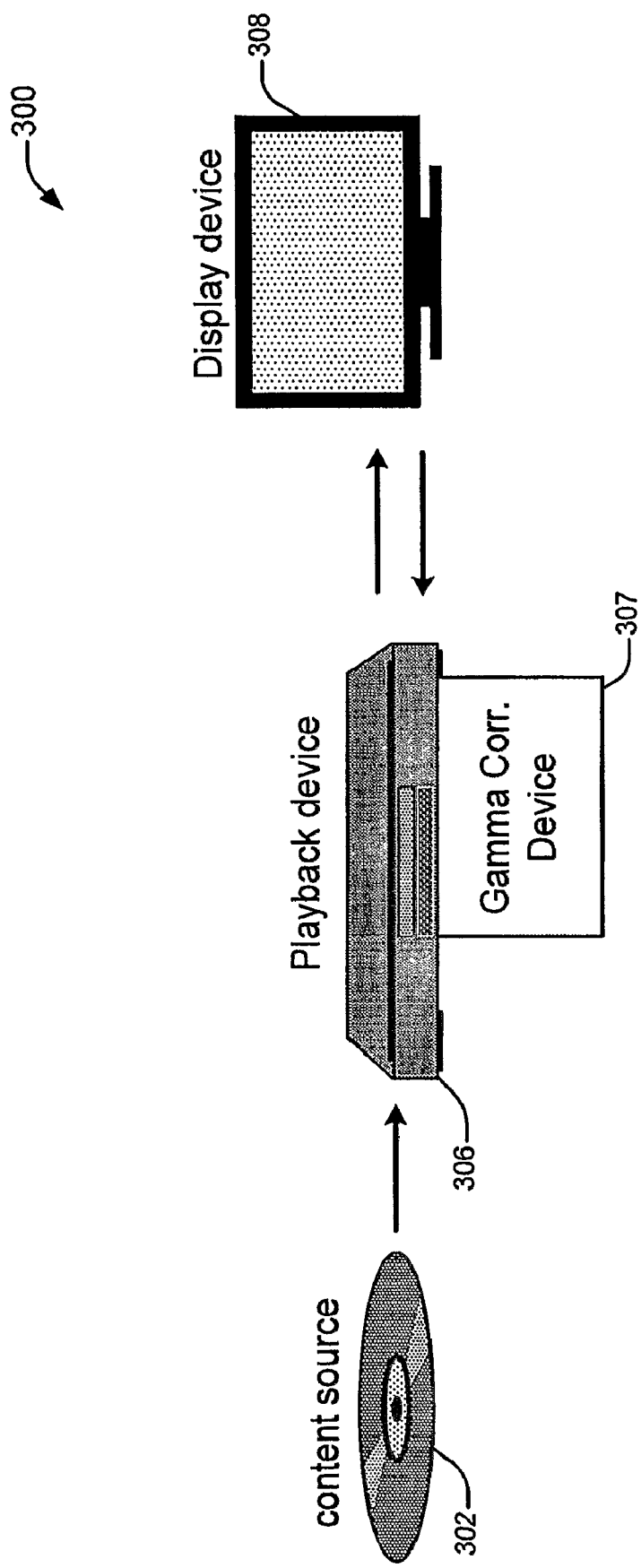
FIG. 3 depicts a high level block diagram of a characterization system for determining gamma correction in accordance with an embodiment of the present invention.

FIG. 3 depicts a high level block diagram of a visual characterization system for determining gamma correction in accordance with an embodiment of the present invention. The visual characterization system 300 of FIG. 3 illustratively comprises a content source 302, a playback device 306 and a display device 308. In FIG. 3, the playback device 306 illustratively comprises a gamma correction device 307. Although in the visual characterization system 300 of FIG. 3, the gamma correction device 307 is depicted as being integrated into the playback device 306, in alternate embodiments of the present invention, the gamma correction device 307 can comprise a separate stand-alone component.

Figure 4:
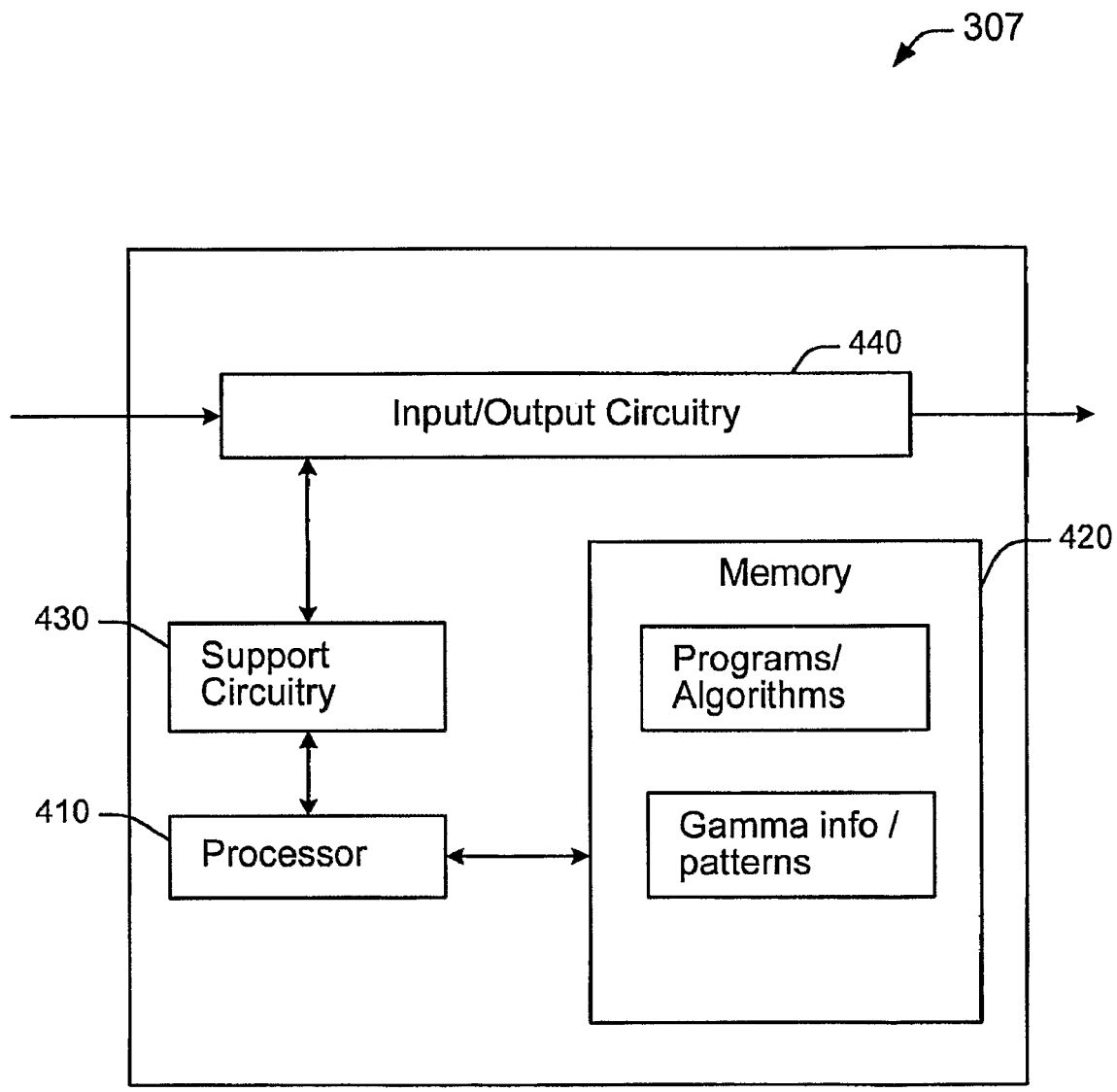
FIG. 4 depicts a high level block diagram of an embodiment of a gamma correction device suitable for use in the visual characterization system of FIG. 3 in accordance with the present invention.

FIG. 4 depicts a high level block diagram of an embodiment of a gamma correction device 307 suitable for use in the visual characterization system 300 of FIG. 3 in accordance with the present invention. The gamma correction device 307 of FIG. 4 comprises a processor 410 as well as a memory 420 for storing control programs, algorithms, gamma information, gamma patterns and the like. The processor 410 cooperates with conventional support circuitry 430 such as power supplies, clock circuits, cache memory and the like as well as circuits that assist in executing the software routines stored in the memory 420. As such, it is contemplated that some of the process steps discussed herein as software processes may be implemented within hardware, for example, as circuitry that cooperates with the processor 410 to perform various steps. The gamma correction device 307 also contains input-output circuitry 440 that forms an interface between the various respective functional elements communicating with the gamma correction device 307.

Although the gamma correction device 307 of FIG. 4 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

In the visual characterization system 300 of FIG. 3, gamma information of received image content from the content source 302 is determined. That is, image content 304 from the content source 302 can include embedded gamma information or gamma information on a separate stream for the image content in the form of, for example, metadata. In various embodiments of the present invention, the content source 302 can include a compact disk (CD), a digital video disk (DVD), a floppy disk, a video stream or any other source of image information. As depicted in the visual characterization system 300 of FIG. 3, the image content 304 from the content source 302 is received by the playback device 306.

The playback device 306 can include a DVD player, CD player, MP3 player, a set-top box, a personal computer or any other device suitably configured to receive and process for display, the image content 304. As previously recited, the image content 304 can include metadata storing a gamma setting, curve or function identifying the gamma of the image content 304. The gamma correction device 307 of the playback device 306 of FIG. 3 determines a pattern to represent the luminance of the image content 304 based upon the received gamma information of the image content 304. For example, in one embodiment of the present invention, the gamma correction device 307 determines respective dot patterns (e.g., halftones) representing the gamma of the image content 304. The patterns representing the gamma of the image content 304 determined by the gamma correction device 307 are displayed on the display 308 and are visually compared to a continuous image also displayed on the display 308. For example, in one embodiment, the continuous image displayed can be a portion of the received image content 304. In an alternate embodiment of the present invention, the continuous image can be a continuous-tone image in a single gray level generated by the gamma correction device, where the gray-level of the continuous image can be adjusted for comparison to respective determined patterns representing the gamma of the image content 304. The brightness and/or contrast level of the display 308 are then adjusted such that an output gamma of the continuous image displayed on the display 308 matches the gamma of the image content 304 as represented by the determined patterns.

For example, in one illustrative embodiment, the image content 304 is received by the playback device 306 (e.g. set-top box or proprietary processing box) and prepared for display on the display 308. To ensure proper display of the image content 304, the playback device 306 via, for example the gamma correction device 307, determines if the gamma of the display 308 has been calibrated in accordance with the present invention. In one embodiment of the present invention, the gamma correction device 307 maintains a list of previously calibrated displays and determines by examining the stored list and by identification of a connected display, if a connected display has been previously calibrated. In an alternate embodiment of the present invention, the gamma correction device 307 communicates with the display 308 to determine if the connected display 308 has been previously calibrated.

If it is determined that the display 308 has not been calibrated, calibration of the gamma of the display in accordance with the present invention is initiated. As previously recited, the playback device 306 receives the image content 304 along with metadata identifying the gamma characteristics of the image content 304. The gamma correction device 307 of the playback device 306 then determines a pattern(s) to represent the luminance of the image content 304 based upon the received gamma information of the image content 304. The determined gamma pattern(s) is then communicated to the display 308. In one embodiment of the present invention, the gamma correction device 307 can generate and communicate to the display 308 a control signal to cause the display 308 to enter into a gamma correction mode. For example, the control signal generated by the gamma correction device can cause the brightness and contrast control mechanisms (e.g., scroll bars) of the display 308 to be made available. Furthermore, the control signal can cause a gamma correction window to be displayed on the display 308 for use in correcting the gamma of the display in accordance with the present invention.

Figure 5:
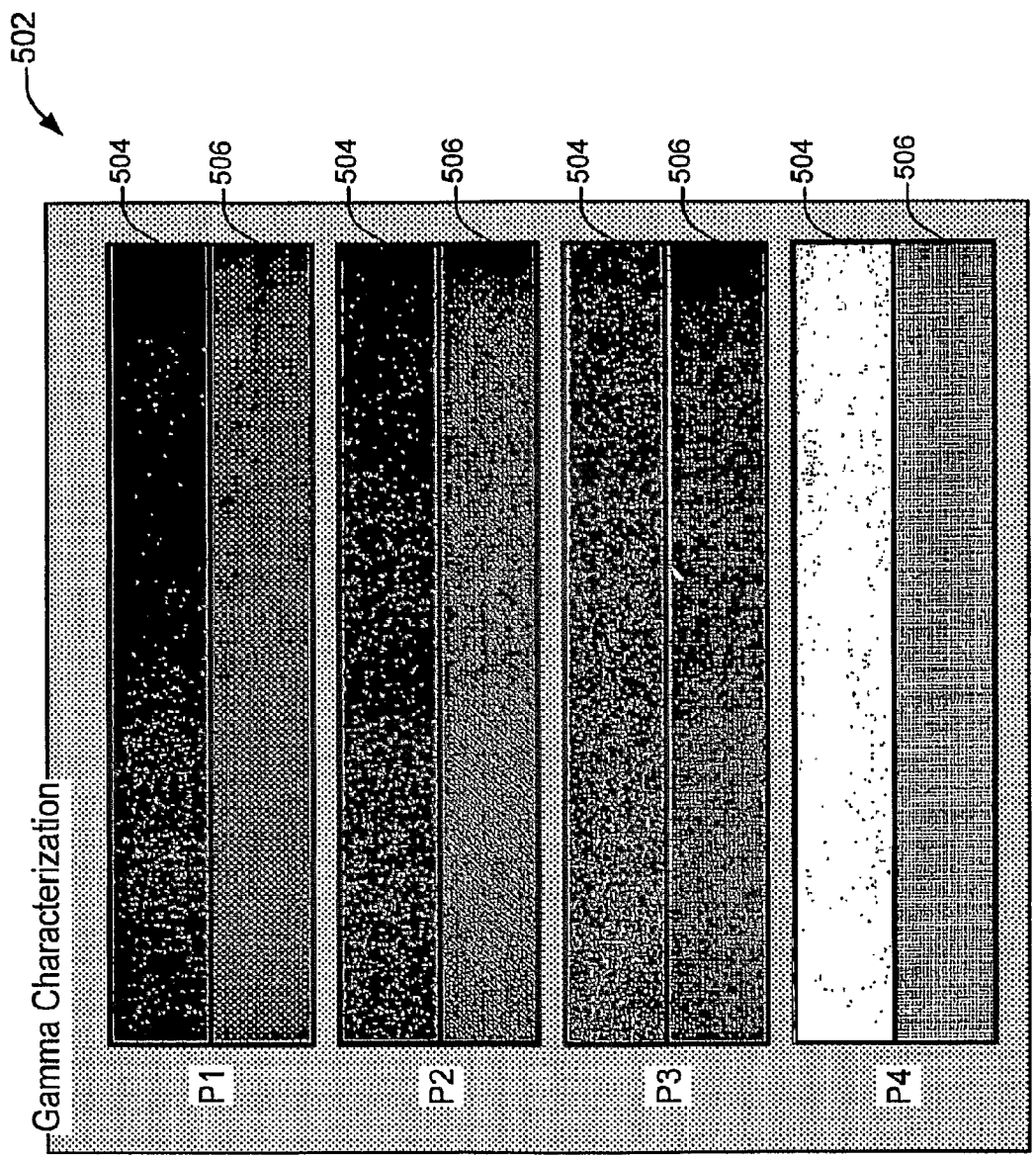
FIG. 5 illustratively depicts four different illustrative pattern windows in an exemplary gamma correction window in accordance with an embodiment of the present invention.
Figure 5:
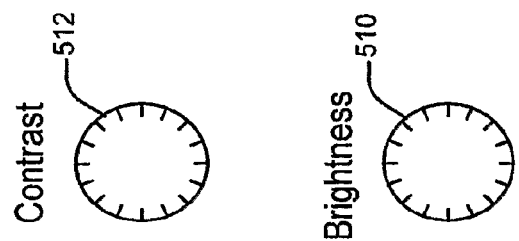

For example, FIG. 5 illustratively depicts four different illustrative pattern windows P1-P4 in an exemplary gamma correction window/graphical interface 502 in accordance with an embodiment of the present invention. The correction window 502 can be generated by the display 308, by the gamma correction device 307 or a combination of both depending on the system configuration. In the embodiment of FIG. 5, each of the four windows P1-P4 of the gamma correction window 502 is further divided into two image windows. A top image window 504 includes a continuous-tone image (as described above), and a bottom image window 506 includes a pattern to represent the luminance of the image content 304 (e.g., a halftone image) in accordance with the present invention. In the embodiment of FIG. 5, the continuous-tone images are images each having a different grey scale value. The continuous-tone image of the top window 504 varies in gamma according to a control value of the brightness and contrast level as set by, for example, the brightness and contrast control mechanisms 510 and 512 of the display device 307. For example, in an 8-bit embodiment of the present invention, the brightness and contrast range is 0-255; however, other bit resolutions can be employed in accordance with the present invention.

In one embodiment of the present invention, a halftone image for representing the gamma of the input image content includes black and white dots. The number of dots in the white background determines the overall luminance. The computation of the luminance of checkerboard pattern where 50% of the dots are black can be characterized according to equation one (1) which follows:

$$L_H = \left(\frac{L_{max} + L_{min}}{2}\right), \tag{1}$$

where $L_H$ depicts the luminance of the checkerboard pattern, $L_{max}$ depicts the luminance of the maximum gray level patch (white), and $L_{min}$ depicts the luminance of the minimum gray level patch (black). If normalized luminance is used, then $L_{max}$ is 1.0 and $L_{min}$ is close to 0.0, hence $L_H$ is 0.5.

A gamma value may be determined by the relationship between the luminance and input digital values according to equation two (2) which follows:

$$L=(D/255)^\gamma, \qquad (2)$$

where L depicts the luminance value and D depicts the digital value. The 255 of equation two is based upon 8-bit resolution. Therefore, if gamma (γ) is known, for a given D value, a corresponding L value can be computed. Once L is determined, by substituting L with $L_H$ in Equation (1), the number of white and black dots can be specified for the halftone image to represent the needed L value.

For example, pattern (P1) in FIG. 5 includes the halftone calculated using an input gamma (γ) and the given D value. Patterns P2, P3 and P4 can be set in a similar way. The four patterns P1-P4 of FIG. 5 correspond to four different D values (e.g., 50, 100, 150, and 200, respectively). It should be understood that although only one pattern is implemented for the gamma characterization and correction in FIG. 5, in alternate embodiments of the present invention, a plurality of patterns can be implemented to improve the characterization and correction accuracy by providing a plurality of different reference points.

In the exemplary patterns P1-P4 in FIG. 5, γ=2.2 and D=100, 164, 186, 224, respectively for P1-P4. Using these values and Equations (1) and (2), the first halftone for P1 should have 8 white dots and 56 black dots in 8×8 array image determined as follows:
1. from Eq. (2), L=(100/255)$^{2.2}$=0.1275
2. in Eq. (1), set $L_H$=L
3. then from Eq. (1), 8 white dots are needed to make $L_H$= (8*1.0+0.0)/64=0.125, which is close to the value L (0.1275).

Note that the denominator, (64), has been updated with the number of positions in the 8×8 matrix. The halftone pattern would then preferably include a repeating pattern to evenly distribute the white dots with the black dots.

Figure 6:
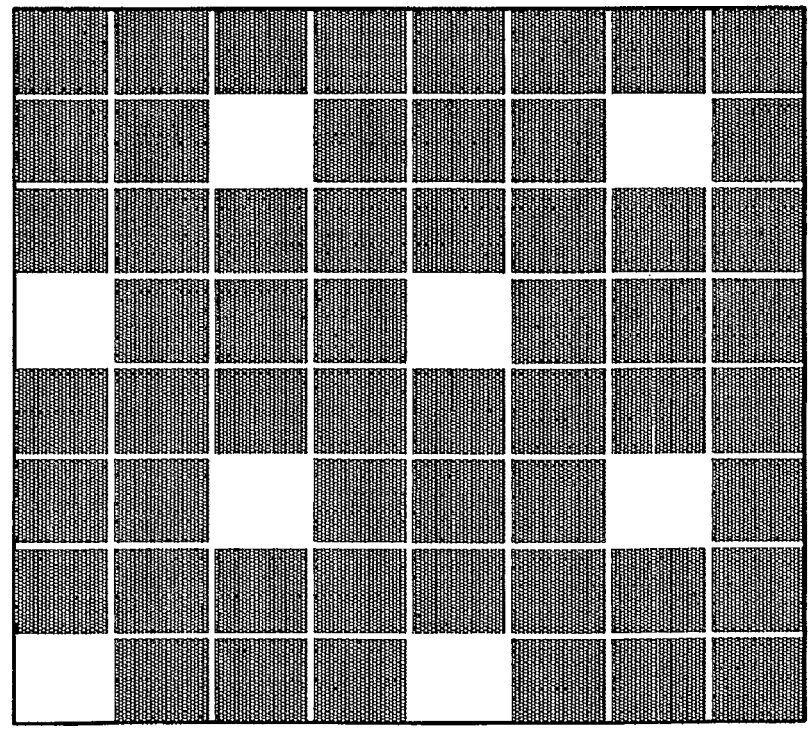
FIG. 6 depicts a graphical representation of a halftone image and a corresponding matrix used to generate the halftone image.

FIG. 6 depicts a graphical representation of a halftone image and a corresponding matrix used to generate the halftone image. For example, the halftone image of FIG. 6 illustratively comprises a repeated 8×8 halftone array as described above for the halftone of P1. The halftone image 602 of FIG. 6 depicts how the determined white and black dots can be arranged. The other halftone images in the windows P2-P4 are similarly determined using corresponding D and γ values. Halftone images can be generated using a digital pattern of highs and lows (1's and 0's) as shown in matrix 604 of FIG. 6 in which black is represented by a zero (0) and white is represented by a one (1). Once the halftone images are determined, each image can be displayed together with the continuous-tone images (as depicted in FIG. 5).

Referring back to FIG. 5, once the halftone images are determined and displayed together with the continuous-tone images on, for example, the gamma correction window/graphical interface 502 of FIG. 5, a user can adjust the brightness and/or contrast of the continuous-tone images using, for example, the brightness and contrast control mechanisms 510 and 512. That is, in accordance with an embodiment of the present invention, the brightness and contrast of the continuous-tone images on, for example, the gamma correction window/graphical interface 502 of FIG. 5 are adjusted to achieve a best possible match between the continuous-tone images (504) and the respective halftone images (506). In the present invention, the halftone images are fixed and are not varied with the respective continuous-tone images varied, for example, using the brightness and contrast control mechanisms 510 and 512. As such, an appropriate level of brightness and/or contrast of a display are determined in accordance with the present invention such that the overall gamma of the display closely matches the gamma of the input image content.

Several advantages of the concepts of the embodiments of the present invention presented herein include characterization/gamma correction without the need for any specialized measurement instrumentation and the display gamma can be tailored to the gamma of input image content, which provides an easier and more efficient means of gamma characterization/correction. In addition, in accordance with the present invention, a user can subjectively decide on a best setting according to personal preference.

Although in the embodiments of the invention described above, it was assumed that gamma curves for the various channels of the input image content (e.g., three channels; red, green, blue) are the same or very similar because the characterization/gamma correction was conducted on gray continuous-tone/halftone patterns, in alternate embodiments of the invention, for the displays having different gamma curves for different channels, the concepts of the present invention can be extended to each color pattern (e.g., R, G, B), and each of the respective gammas can be characterized/corrected individually in accordance with the present invention.

In addition, although in the embodiments described above a power function (e.g., Eq. (2)) was used to create a pattern representing the gamma of input image content, in alternate embodiments the gamma of the image content may not be capable of being represented by a power function. For example, if the gamma of the input image content is represented by an S-curve or another non-linear shape that was different from the power function, some accuracy in the gamma characterization/correction of the present invention can be lost. However, in accordance with the present invention, the loss in accuracy can be compensated by, for example, providing more patterns representing the gamma of the input image content and as such, providing more gray scale images in the display for comparison to the patterns representing the gamma of the input image content. In addition, gain and offset terms can be considered, for example, in Eq. (2). Gain and offset parameters can be included as in the typical gamma characterizations.

Figure 7:
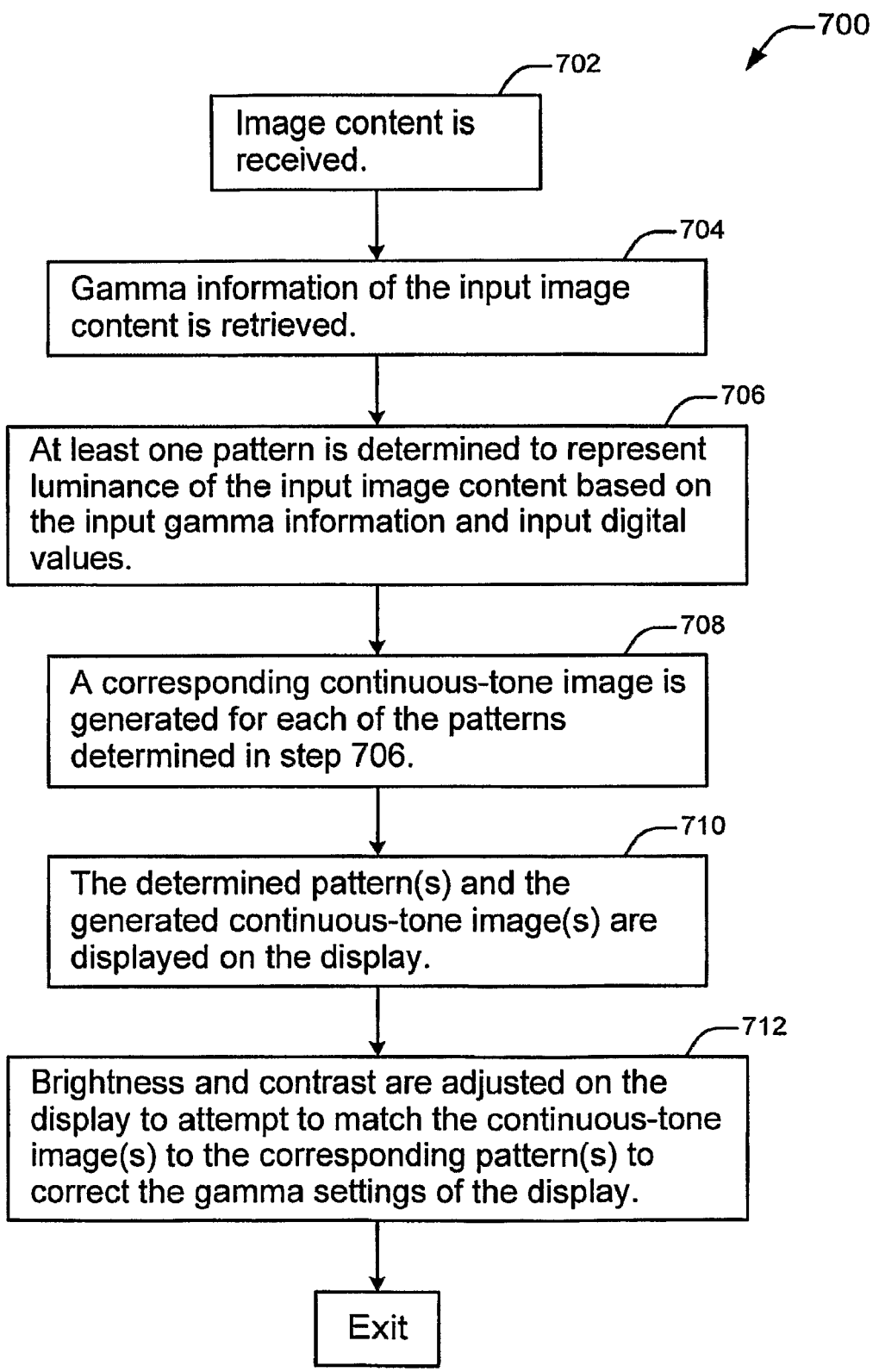
FIG. 7 depicts a flow diagram of a method for characterizing/correcting display gamma in accordance with an embodiment of the present invention.

FIG. 7 depicts a flow diagram 700 of a method for characterizing/correcting display gamma in accordance with an embodiment of the present invention. The method 700 of FIG. 7 begins at step 702 in which image content is received. The method 700 proceeds to step 704.

At step 704, gamma information of the input image content is retrieved. For example and as described above, in one embodiment of the present invention, image content 304 from the content source 302 can include embedded gamma information or gamma information can be received on a separate stream for the image content in the form of, for example, metadata. The method 700 proceeds to step 706.

At step 706, at least one pattern is determined to represent luminance based upon the input gamma information and input digital values (see, e.g., Eqs. 1 and 2 as illustratively described above) of the input image content. For example, in one embodiment of the present invention, this can include computing a halftone matrix having black and white dots. A ratio of black and white dots is determined based on luminance, and the matrix includes a spacing pattern between the black and white dots. The plurality of dot patterns can correspond to a plurality of discrete input digital values. The method 700 then proceeds to step 708.

At step 708, a corresponding continuous-tone image is generated for each of the patterns determined in step 706. That is, in one embodiment of the present invention, a corresponding continuous-tone image can be generated for a luminance level represented by each of the patterns determined in step 706. The method 700 then proceeds to step 710.

At step 710, the determined pattern(s) and the generated continuous-tone image(s) are displayed on a display to be characterized/corrected in accordance with the present invention. The method 700 then proceeds to step 712.

At step 712, brightness and contrast are adjusted on the display to attempt to match the continuous-tone image(s) to the corresponding dot pattern(s) to correct the gamma settings of the display. The method 700 is then exited.

As previously described, although the embodiment described in the method 700 of FIG. 7, continuous-tone image(s) are generated for comparison with the determined pattern(s) (e.g., the dot patterns), in alternate embodiments of the present invention, the dot pattern(s) can instead be compared with an actual picture image displayed on the display. In addition and as previously described, although in the method 700 of FIG. 7, the characterization/gamma correction was performed for a single channel or channels having substantially similar gamma curves, in alternate embodiments of the invention, the concepts of the present invention can be extended to a plurality of channels (e.g., R, G, B), and each of the respective gammas can be characterized/corrected individually in accordance with the present invention.

Having described preferred embodiments for a method, apparatus and system for visual gamma correction in display systems (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

The invention claimed is:

1. A method for visual gamma correction of a display system, comprising:
    retrieving gamma information relating to received image content;
    determining at least one pattern representing luminance of the received image content based upon at least the retrieved gamma information;
    displaying the at least one determined pattern representing the luminance of the received image content and at least one corresponding reference image on the display system; and
    adjusting brightness and contrast of the at least one reference image on the display system to approach the luminance of a corresponding determined pattern.

2. The method of claim 1, wherein the brightness and contrast of the at least one reference image is adjusted to approach the luminance of a corresponding determined pattern to determine a corrected gamma for the display system.

3. The method of claim 1, wherein determining a pattern includes computing a halftone matrix having black and white dots.

4. The method of claim 3, wherein a ratio of black and white dots is determined based on luminance.

5. The method of claim 1, wherein digital values of the received image content are additionally used to determine the at least one pattern representing the luminance of the received image content.

6. The method of claim 1, wherein a plurality of patterns are generated corresponding to discrete digital values of the received image content.

7. The method of claim 1, wherein the at least one corresponding reference image comprises a continuous-tone image.

8. The method of claim 1, wherein the reference image comprises an image of said received image content.

9. The method of claim 1, wherein a pattern representing the luminance of the received image content is determined for a plurality of channels.

10. The method of claim 9, wherein the plurality of channels include color components of the received image content.

11. The method of claim 10, wherein the color components comprise red, blue and green color components.

12. An apparatus for visual gamma correction of a display system, comprising:
    a memory for storing at least gamma information and control programs and a processor for executing the control programs, the apparatus configured to:
        retrieving gamma information relating to received image content;
        determine at least one pattern representing luminance of the received image content based upon at least the retrieved gamma information;
        enable the display of the at least one determined pattern representing the luminance of the received image content and at least one corresponding reference image on the display system; and
        enable the adjustment of brightness and contrast of the at least one reference image on the display system to approach the luminance of a corresponding determined pattern.

13. The apparatus of claim 12, wherein the apparatus generates a graphical user interface for enabling the display of the at least one determined pattern and the at least one corresponding reference image on the display system for enabling the adjustment of the brightness and contrast of the at least one reference image on the display system to approach the luminance of a corresponding determined pattern.

14. The apparatus of claim 12, wherein said apparatus is a component of a video playback device.

15. The apparatus of claim 12, wherein the at least one pattern comprises at least one halftone matrix.

16. The apparatus of claim 12, wherein a plurality of dot patterns are generated corresponding to discrete digital values of the received image content and wherein the at least one reference image comprises a corresponding continuous-tone image for each of the plurality of dot patterns, the continuous-tone images being adjustable by the brightness and contrast controls of the display system to approach the luminance of a corresponding determined pattern to determine a corrected gamma for the display system.

17. The apparatus of claim 12, wherein digital values of the received image content are additionally used to determine the at least one pattern representing the luminance of the received image content.

18. The apparatus of claim 12, wherein the at least one corresponding reference image is generated by the apparatus.

19. A system for visual gamma correction of a display system, comprising:
    a content source for providing image content and gamma information relating to the image content;

a video playback device for receiving the image content and the gamma information from the content source and for communicating display images to the display system;

the display system for displaying the images communicated from the playback device; and a gamma correction device including a memory for storing at least the gamma information and control programs and a processor for executing the control programs, the gamma correction device configured to:

retrieve the gamma information relating to the received image content;

determine at least one pattern representing luminance of the received image content based upon at least the retrieved gamma information;

enable the display of the at least one determined pattern representing the luminance of the received image content and at least one corresponding reference image on the display system; and enable the adjustment of brightness and contrast of the at least one reference image on the display system to approach the luminance of a corresponding determined pattern.

20. The system of claim 19, wherein the gamma correction device generates a graphical user interface for enabling the display of the at least one determined pattern and the at least one corresponding reference image on the display system for enabling the adjustment of the brightness and contrast of the at least one reference image on the display system to approach the luminance of a corresponding determined pattern.

21. The system of claim 20, wherein the graphical user interface is displayed on the display system.

22. The system of claim 19, wherein the display system comprises brightness and contrast controls configured to adjust the brightness and contrast of the at least one reference image on the display system to approach the luminance of a corresponding determined pattern to determine a corrected gamma for the display system.

23. The system of claim 19, wherein the gamma correction device is integrated in the video playback device.

24. The system of claim 19, wherein digital values of the received image content are additionally used to determine the at least one pattern representing the luminance of the received image content.

25. The system of claim 19, wherein the at least one corresponding reference image is generated by the gamma correction device.

* * * * *